S. A. D. PUTER AND E. J. BOYLER.
SEPARABLE FASTENER.
APPLICATION FILED DEC. 7, 1915.
1,313,331. Patented Aug. 19, 1919.
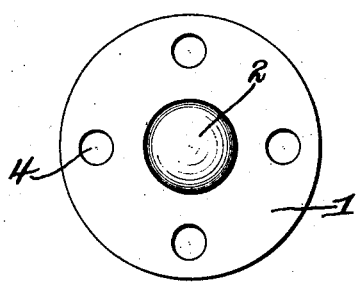
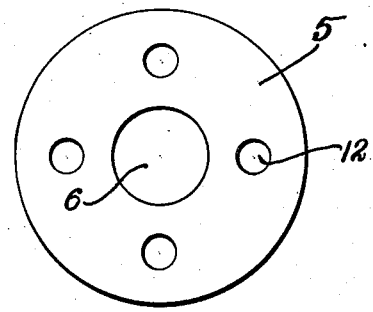
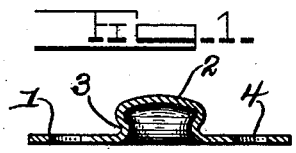
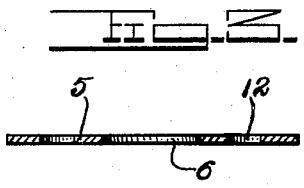
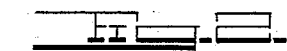
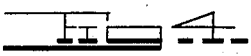
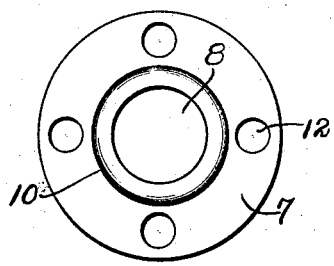
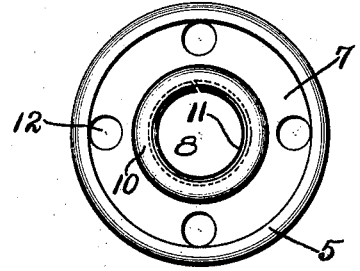
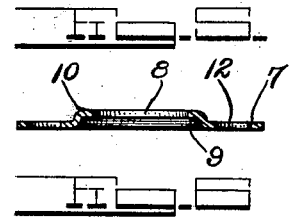
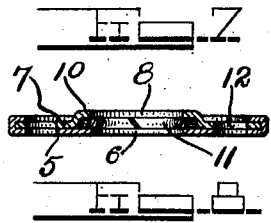
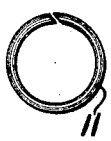
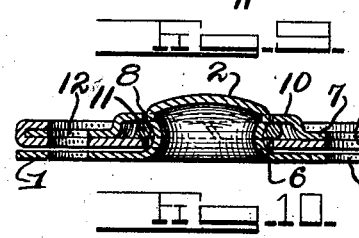
Inventor
S. A. D. PUTER
AND
E. J. BOYLER.
Langdon Moor
Attorney

UNITED STATES PATENT OFFICE.

STEPHEN A. D. PUTER, OF BERKELEY, CALIFORNIA, AND EMANUEL J. BOYLER, OF NEW HAVEN, CONNECTICUT, ASSIGNORS TO DUPLEX SNAP FASTENER CO. INC., A CORPORATION OF NEW YORK.

SEPARABLE FASTENER.

1,313,331.        Specification of Letters Patent.        Patented Aug. 19, 1919.

Application filed December 7, 1915. Serial No. 65,451.

*To all whom it may concern:*

Be it known that we, STEPHEN A. D. PUTER, a citizen of the United States, residing at Berkeley, in the county of Alameda and State of California, and EMANUEL J. BOYLER, a citizen of the United States, residing at New Haven, in the county of New Haven and State of Connecticut, have invented new and useful Improvements in Separable Fasteners, of which the following is a specification.

This invention relates to improvements in separable fasteners and more particularly to a fastener of the head and socket type.

It is the object of this invention to provide a separable fastener in which the head is engaged by a resilient wire in the socket, from which the head may be readily disengaged.

The advantages of this invention are the simplicity of construction and the small number of parts which cheapen the cost of assembling, and the thinness of the united parts of the fastener when engaged which is extremely desirable as these fasteners are used extensively on ladies' dresses.

While the preferred form of this invention is illustrated upon the accompanying sheet of drawings yet it is to be understood that minor detail changes may be made without departing from the scope thereof.

Figure 1 is a top plan view of the head member of this improved fastener.

Fig. 2 is a view in central transverse vertical section through Fig. 1.

Fig. 3 is a top plan view of the blank for the base plate of the socket.

Fig. 4 is a view in central transverse vertical section through Fig. 3.

Fig. 5 is a top plan view of the top plate of the socket.

Fig. 6 is a view in central transverse vertical section through Fig. 5.

Fig. 7 is a top plan view of the completed socket.

Fig. 8 is a central transverse vertical section through Fig. 7.

Fig. 9 is a top plan view of the securing spring ring.

Fig. 10 is a central transverse vertical section through the fastener with the head engaged in the socket.

In carrying out this invention the head member of the fastener comprises a circular plate 1 with a head 2 centrally struck up therefrom having a restricted neck 3 adjacent the plate and the plate is provided adjacent its periphery with a plurality of holes 4 for sewing the head member to the dress goods.

The socket member comprises a circular base plate 5 having a central opening 6 of sufficient diameter for the head 2 to pass therethrough. A circular top plate 7 is secured thereto, preferably by crimping the edges of the base plate thereabout, which top plate is provided with a central opening 8 of the same size as the opening 6 in the base plate. The metal of the top plate about the central opening 8 is struck up forming an annular recess 9 beneath the raised portion 10 about the aperture 8.

A spring 11 in the form of a split ring of less inner diameter than the diameter of the apertures 6 and 8 of the socket members is inserted in the recess 9 of the top plate 7 before the base plate 5 is secured thereto. A plurality of registering holes 12 is provided through the top and bottom plates for sewing the socket member to the dress goods.

It is readily seen that when the head 2 is inserted in the socket member it will distend the spring 11 which will contract about the restricted neck 3 of the head and maintain the parts together against side strains but release the head upon a direct pull at right angles to the socket.

With the exception of the spring all the parts are struck from sheet metal and the assembling of the socket is very simple as there are only three parts to be put together and the spring is held between the top and base plate by crimping of the base plate about the top plate. There are no parts to become disengaged in the socket and the spring, upon which the operation of the fastener depends, is completely covered and protected.

What I claim is:—

A separable fastener comprising a head member including a base; an approximately flat head disposed thereon and having a restricted neck portion; a socket member including a base plate provided with an opening through which the head is adapted to pass; a top plate secured to the base plate and provided with an opening through which a portion of the head is adapted to protrude when the members are assembled; a raised portion on the top plate extending into approximately the plane of the edges of the protruding portion of the head when the members are assembled, and forming, with the protruding portion of the head, an approximately flat surface; and a securing means housed between the top plate and base plate and adapted to engage the neck portion when the head is inserted.

STEPHEN A. D. PUTER.
EMANUEL J. BOYLER.

Witnesses:
GEORGE E. LAPHAM,
MINNIE C. LAPHAM.

Copies of this patent may be obtained for five cents each, by addressing the "Commissioner of Patents, Washington, D. C."